(12) United States Patent
Choi

(10) Patent No.: US 8,046,928 B2
(45) Date of Patent: Nov. 1, 2011

(54) METHOD AND DEVICE FOR CALIBRATING MOBILE TERMINAL

(75) Inventor: Myong Hwan Choi, Seoul (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 12/723,916

(22) Filed: Mar. 15, 2010

(65) Prior Publication Data

US 2010/0273461 A1    Oct. 28, 2010

(30) Foreign Application Priority Data

Apr. 22, 2009  (KR) .................. 10-2009-0034974

(51) Int. Cl.
*G01C 9/06*    (2006.01)
(52) U.S. Cl. ...................................... 33/366.12; 33/390
(58) Field of Classification Search ............... 33/366.11, 33/366.12, 390
See application file for complete search history.

(56) References Cited

U.S. PATENT DOCUMENTS

| | | | | |
|---|---|---|---|---|
| 5,136,784 A * | 8/1992 | Marantz | ..................... | 33/366.24 |
| 5,594,669 A * | 1/1997 | Heger | ........................ | 702/154 |
| 7,042,391 B2 * | 5/2006 | Meunier et al. | ............... | 342/464 |
| 7,210,236 B2 * | 5/2007 | Sato et al | ........................ | 33/356 |
| 7,389,591 B2 * | 6/2008 | Jaiswal et al. | ............. | 33/366.11 |
| 7,562,459 B2 * | 7/2009 | Fourquin et al. | ........... | 33/366.11 |
| 7,893,971 B2 * | 2/2011 | Sato et al. | ..................... | 348/234 |
| 2005/0166410 A1 * | 8/2005 | Richter et al. | ............. | 33/366.12 |
| 2006/0097983 A1 * | 5/2006 | Haggman et al. | ............. | 345/156 |
| 2007/0033818 A1 * | 2/2007 | Kitamura et al. | ........... | 33/355 R |
| 2009/0119938 A1 * | 5/2009 | Song | ........................ | 33/366.14 |
| 2010/0229410 A1 * | 9/2010 | Schubert | ................... | 33/366.27 |

* cited by examiner

*Primary Examiner* — Christopher Fulton
(74) *Attorney, Agent, or Firm* — Cha & Reiter, LLC

(57) ABSTRACT

A method and device for calibrating a mobile terminal including a motion sensor reduces erroneous calibrations. The method of calibrating a mobile terminal by detecting an inclination of at least two directions preferably includes: activating a calibration mode for calibrating an error of the motion sensor. When a calibration mode is activated, a user interface screen for calibrating the motion sensor is output. The user interface screen outputs a coordinate system for displaying at least two facets of information; and inclination information of at least two directions received from the motion sensor is output as one image on the coordinate system.

19 Claims, 7 Drawing Sheets

METHOD AND DEVICE FOR CALIBRATING MOBILE TERMINAL

CLAIM OF PRIORITY

This application claims priority from and the benefit of Korean Patent Application No. 10-2009-0034974 filed in the Korean Intellectual Property Office on Apr. 22, 2009, the entire contents of which are incorporated herein by reference.

BACKGROUND OF THE INVENTION

1. Field of the Invention

The present invention relates to a method and device for calibrating a mobile terminal. More particularly, the present invention relates to a method and device for calibrating a mobile terminal including a motion sensor.

2. Description of the Related Art

Mobile terminals are now very widely used throughout the world, as the development of mobile communication technology provide various functions such as an Moving Picture Experts Group layer-3 (MP3) function, a mobile broadcasting reception function, a moving picture reproducing function, and a camera function has increased their usefulness. Nowadays, a mobile terminal that includes a motion sensor that can recognize a motion has been developed, and a user interface (hereinafter, an UI) and along with a game that utilizes the motion sensor have been developed. However, the motion sensor is a device requiring a great deal of accuracy for proper function. Therefore, in general, the mobile terminal provides a calibration menu of the motion sensor. The calibration is to adjust accuracy of a measuring device by comparing with a reference device in order to enhance accuracy of a measuring device and to adjust a reference point and a scale of the measuring device in order to reduce the measurement error.

For example, the calibration may indicate setting a zero of a scale. That is, while using a mobile terminal, when it is determined that a motion sensor does not appropriately operate, the user can calibrate (or re-calibrate) the motion sensor. However, a calibration UI screen provided by a conventional mobile terminal divides into a horizontal (inclination) degree of the mobile terminal recognized by the motion sensor in a landscape orientation and a portrait orientation. Thus, a calibration UI screen of a conventional mobile terminal is inconvenient in recognizing a horizontal degree of the mobile terminal at a glance. Furthermore, conventionally, a degree of progress of a calibration function is not displayed, and even when a mobile terminal moves (or is moved) while performing a calibration, the calibration process was still performed. Accordingly, as the motion sensor performs a calibration, the error rate may increase.

SUMMARY OF THE INVENTION

The present invention provides a method and device for calibrating a mobile terminal that can easily enable a user to perform a calibration of a motion sensor, and that can provide a UI screen for enabling the ability to recognize intuitively a horizontal state of the mobile terminal at a glance.

In accordance with an exemplary aspect of the present invention, a calibration device of a mobile terminal includes: a motion sensor for detecting inclination information about at least two directions of the mobile terminal; and a display unit for outputting, when a calibration mode is activated, inclination information about the detected at least two directions as one image on a coordinate system.

In accordance with another exemplary aspect of the present invention, a method of calibrating a mobile terminal comprising a motion sensor for detecting an inclination of at least two directions of the mobile terminal includes: activating a calibration mode for calibrating an error of the motion sensor; outputting an indication, when a calibration mode is activated; displaying a coordinate system for displaying at least two facets of information; and outputting inclination information of at least two directions received from the motion sensor as one image on the coordinate system.

BRIEF DESCRIPTION OF THE DRAWINGS

The exemplary objects, features and advantages of the present invention will become more apparent from the following detailed description in conjunction with the accompanying drawings, in which.

DETAILED DESCRIPTION

Figure 1:
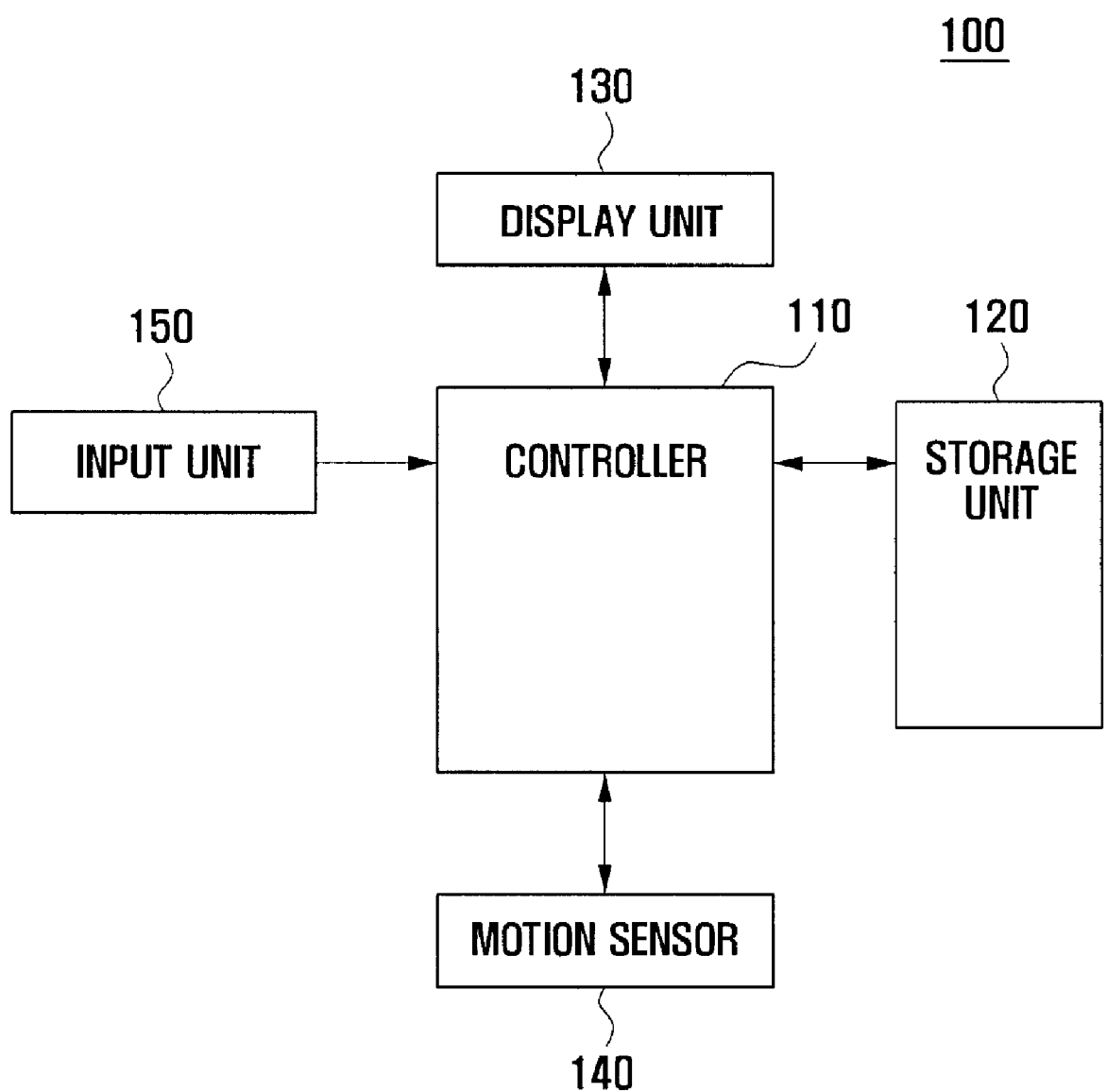
FIG. 1 a block diagram illustrating a configuration of a mobile terminal according to an exemplary embodiment of the present invention.

Hereinafter, preferred exemplary embodiments of the present invention are described in detail with reference to the accompanying drawings. The same reference numbers are used throughout the drawings to refer to the same or like parts. The views in the drawings are explanatory and are not intended to be to in scale or correctly proportioned. Detailed descriptions of well-known functions and structures incorporated herein may be omitted to avoid obscuring appreciation of the subject matter of the present invention by a person of ordinary skill in the art.

While the present invention may be embodied in many different forms, specific exemplary embodiments of the present invention are shown in drawings and are described herein in detail, with the understanding that the present disclosure is to be considered as an exemplification of the principles of the invention and is not intended to limit the invention to the specific exemplary embodiments illustrated.

In the following description, for convenience of description, a mobile terminal according to the present invention includes a motion sensor, and can comprise an information and communication device or a multimedia device such as a navigation terminal, digital broadcasting terminal, personal digital assistant (PDA), smart phone, portable multimedia player (PMP), International Mobile Telecommunication 2000 (IMT-2000) terminal, code division multiple access (CDMA) terminal, wideband code division multiple access (WCDMA) terminal, Global System for Mobile Communication (GSM) terminal, Universal Mobile Telecommunication Service terminal (UMTS), and applications thereof, just to name a few possibilities.

FIG. 1 a block diagram illustrating a configuration of a mobile terminal according to an exemplary embodiment of the present invention.

Referring now to FIG. 1, a mobile terminal 100 according to the present exemplary embodiment preferably includes a controller 110, storage unit 120, display unit 130, motion sensor 140, and input unit 150.

The input unit 150 preferably includes a plurality of input keys and function keys for inputting numeral or character information and setting various functions. The function keys include direction keys, side keys, and hotkeys that are set to perform a specific function. Particularly, in the present exemplary embodiment, the input unit 150 includes a hotkey for executing a calibration mode and accelerator key and a function key for performing a calibration execution instruction of the motion sensor 140.

The motion sensor 140 is a sensor for determining movement of the mobile terminal 100. That is, the motion sensor 140 outputs a signal according to a motion of the mobile terminal 100 to the controller 110 when motion is sensed. Such a motion sensor 140 is preferably formed with a combination of a terrestrial magnetic sensor, gyro sensor, acceleration sensor, gravity sensor, and inclination sensor. Particularly, in the present exemplary embodiment, the motion sensor 140 outputs a signal including inclination information (inclination information about at least two directions) of the mobile terminal 100 to the controller 110. The motion sensor 140 is a device requiring a high degree of accuracy. In general, after a time, accuracy of the motion sensor 140 begins to decline. Therefore, a user should calibrate the motion sensor 140, perhaps periodically to ensure accuracy in the readings. To reduce the need for performing the calibration process, one way to determine whether the mobile terminal 100 requires calibration is to position the mobile terminal in a horizontal direction, and if a value output from the motion sensor 140 does not correspond to a preset reference point due to an influence such as a temperature and a magnetic field, a calibration process should be performed for calculating an offset value for corresponding the value output from the motion sensor 140 to a starting point. In order to perform the calibration process, after arranging the mobile terminal 100 on a table determined to have a horizontal surface through the use of another measuring device, the user performs the calibration process. Alternatively, the user may also compare a value obtained by the motion sensor 140 with a value obtained by a motion sensor of another mobile terminal having no error and adjust the motion sensor 140 to correspond both values. The calibration methods are known by a person of ordinary skill in the art and therefore a detailed description thereof is omitted.

The storage unit 120 stores programs necessary for performing general operations and a specific function of the mobile terminal 100 and data generated while performing the programs. For example, the storage unit 120 stores an operating system for booting the mobile terminal 100, an application program necessary for performing an operating function of the mobile terminal 100, and data generated according to use of the mobile terminal 100. The storage unit 120 includes a read only memory (ROM) and a random access memory (RAM). More particularly, in the present exemplary embodiment, the storage unit 120 stores a program for performing a calibration of the motion sensor 140. Further, the storage unit 120 stores an offset value for calibrating the motion sensor 140.

With continued reference to FIG. 1, the display unit 130 outputs screen data generated while performing a function of the mobile terminal 100 and state information according to a user's key manipulation and function setting. Further, the display unit 130 visually displays several signals and color information output from the controller 110. The display unit 130 preferably can be formed as a liquid crystal display (LCD) and an organic light-emitting diode (OLED). In addition, any other type of thin-film technology display may be employed. When the display unit 130 is formed as a touch screen method, the display unit 130 can be operated as an input unit for performing an input action of the user. Particularly, in the present exemplary embodiment, the display unit 130 can output an UI screen for performing a calibration of the motion sensor 140. A description of such an UI screen is described later with reference to FIG. 3 to FIG. 7.

The controller 110 performs general control functions of the mobile terminal 100 and controls a signal flow between units in the mobile terminal 100. The controller 110 controls a signal flow between units such as the storage unit 120, display unit 130, motion sensor 140, and input unit 150. Particularly, in the present exemplary embodiment, the controller 110 determines a motion (for example, shaking and striking) of the mobile terminal 100 according to a user operation by analyzing a signal output from the motion sensor 140. In order to accurately determine a motion of the mobile terminal 100, the motion sensor 140 should have no error. When the motion sensor 140 has an error, the controller 110 performs a calibration process for adjusting an error of the motion sensor 140. That is, when the user activates a calibration mode through the input unit 150, the controller 110 controls the display unit 130 to output an UI screen for performing a calibration. Here, the UI screen includes a coordinate system for displaying at least two facets of information. The UI screen has at least one concentric circle using a starting point of the coordinate system as the center. In this particular case, the controller 110 outputs status regarding an inclination of the mobile terminal 100 as an image form (for example, a point having a predetermined size) to the coordinate system using inclination information of at least two directions received from the motion sensor 140 as an order pair. For example, when the mobile terminal 100 is inclined to the right side, the controller 110 controls the display of the image in the 3 o'clock direction of the coordinate system, and when the mobile terminal 100 is inclined to the left side, the controller 110 controls the display of the image in the 9 o'clock direction of the coordinate system. In this way, as an inclination degree of the mobile terminal 100 increases, the controller 110 controls displaying the image at a far location from a starting point of the coordinate system.

When a calibration instruction of the motion sensor 140 is input, i.e. when a calibration menu is activated, the controller 110 controls the output of a warning message notifying that a calibration of the motion sensor 140 is being performed and instructing anyone reading the display or listen to a warning that the mobile terminal 100 can not be moved during the calibration process. When the calibration is complete, the controller 110 stores an offset value calculated to amend an error of the motion sensor 140 in the storage unit 120. While performing a calibration of the motion sensor 140, when a motion of the mobile terminal 100 is detected, the controller 110 stops a calibration and controls output of a message notifying the user of the calibration has stopped, and outputs a message requesting whether or not to recalibrate the motion sensor 140.

Further, although not shown, the mobile terminal 100 may further include units having an additional function, such as a camera module for photographing an image or a moving picture, a short range communication module for performing short range wireless communication, broadcasting reception module for receiving broadcasting, digital sound source reproducing module such as an MP3 module, and Internet communication module for performing an Internet function by communicating with an Internet network.

A method of calibrating a mobile terminal according to another exemplary embodiment of the present invention will now described hereinafter.

Figure 2:
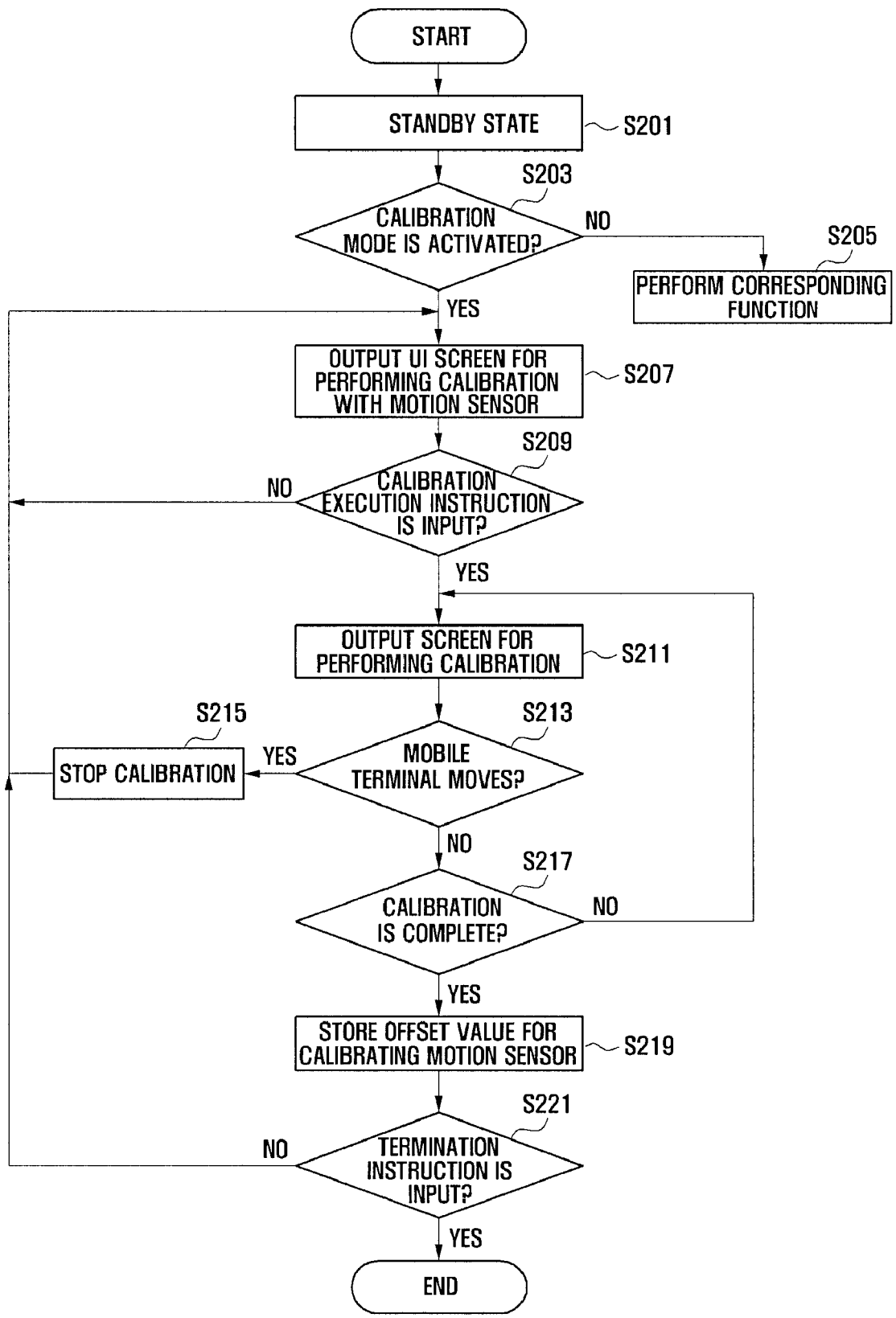
FIG. 2 is a flowchart illustrating a method of calibrating a mobile terminal including a motion sensor according to another exemplary embodiment of the present invention.

FIG. 2 is a flowchart illustrating a method of calibrating a mobile terminal according to another exemplary embodiment of the present invention.

Referring now to FIGS. 1 and 2, at step (S201) the controller 110 is in a standby state. At step (S203), the controller 110 determines whether or not a calibration mode has been activated. The calibration function is a process of calculating an offset value so that an inclination value obtained by the motion sensor 140 corresponds to a preset reference point in a horizontal state such as setting a zero of a measuring device, such as a scale, for accurate measurement.

If a calibration mode is not activated, at step (S205) the controller 110 performs a corresponding function. For example, the controller 110 may perform a broadcasting reception function, or perform a game function using the motion sensor 140. If a calibration mode is activated, at step (S207) the controller 110 controls output of to the display unit 130 of an UI screen for performing a calibration with the motion sensor 140. The display unit 130 outputs a coordinate system that can display at least two facets of information when an UI screen is displayed, combines inclination information of at least two directions output from the motion sensor 140, i.e. arranges the inclination information in an order pair, and outputs the combined inclination information to the coordinate system. The display unit 130 may further output a plurality of concentric circles using a starting point as the center in order to check for accuracy of the motion sensor. Here, when the image is output at the center of the plurality of concentric circles, it is determined that the motion sensor 140 has no error. However, when the mobile terminal 100 is positioned at a horizontal location and the output image is deviated from the center of the concentric circle, it is determined that the motion sensor 140 has error. In this case, in order to accurately calibrate the motion sensor 140, it is determined whether the mobile terminal 100 is positioned at a horizontal location (e.g. a desk and a table) using a horizontal measuring device (for example, a horizontal leveler device).

With continued reference to FIG. 2, at step (S209) the controller 110 determines whether or not a calibration execution instruction is input. If a calibration execution instruction is not input, the process returns to step S207. If a calibration instruction is input, then at step (S211) the controller 110 performs a calibration of the motion sensor 140 and controls to output a screen corresponding thereto. The controller 110 controls the display unit 130 to output a warning message instructing that the mobile terminal 100 cannot be moved because a calibration is being performed. For example, the controller 110 may control to display a pop-up message such as "Calibration is being performed. Do not move device" at one side of a screen. Further, the controller 110 controls to display a progress degree of a calibration using a graphic effect. For example, the controller 110 controls to display a progress bar notifying about the degree of progress of the calibration at one side of the display unit 130, or to fill a specific color in a center direction from an outer edge of the concentric circle to correspond to a progress degree of the calibration. Alternatively, the controller 110 can move the image in a center direction of the concentric circle to correspond to a progress degree of a calibration. That is, when the image is moved to the center of the concentric circle, the controller 110 has determined that a calibration is complete.

At step (S213), the controller 110 determines whether the mobile terminal 100 moves. If the mobile terminal 100 moves, then at step (S215) the controller 110 stops a calibration and the process continues at step S207. In this case, the controller 110 controls the output of a message notifying that a calibration has stopped and a message determining whether to recalibrate the motion sensor 140. If the mobile terminal 100 does not move, then at step (S217) the controller 110 determines whether a calibration is complete. If a calibration is not complete, the process returns to step S211. If a calibration is complete, at step (S219) the controller 110 stores an offset value for calibrating the motion sensor 140 in the storage unit 120.

At step (S221), the controller 110 determines whether a termination instruction is input. If a termination instruction is input, the controller 110 terminates a calibration mode and the mobile terminal 100 is in a standby state. If a termination instruction is not input, the process returns to step S207.

Examples of screens according to another exemplary embodiment of the present invention are described in detail hereinafter.

FIGS. 3 to 7 are examples of screens illustrating a process of the exemplary method of FIG. 2.

Referring now to FIGS. 1 to 7, when a calibration mode is performed, the display unit 130 outputs a first screen 310. That is, the display unit 130 outputs a coordinate system that can display at least two facets of information by the control of the controller 110 and outputs inclination information about at least two directions of the mobile terminal 100 output from the motion sensor 140 as one image to the coordinate system. Further, the display unit 130 outputs a plurality of concentric circles using a starting point P of the coordinate system as the center. The plurality of concentric circles enables the user to easily determine an inclination degree of the mobile terminal 100. As an inclination degree of the mobile terminal 100 increases, a separation distance of an image from a starting point P of the coordinate system increases, and the display unit 130 outputs an image 10. The controller 110 receives inclination information about at least two directions (for example, a horizontal direction and a vertical direction) from the motion sensor 140 and controls the display of an inclination of the mobile terminal 100 at the coordinate system using inclination information of the received each direction as an ordered pair.

The image 10 displayed on the first screen 310 is output to deviate from the center of a concentric circle 40. This represents that the motion sensor 140 has an error. Thereafter, in order to calibrate the motion sensor 140, the user activates a calibration menu 20 output at one side of the display unit 130, as shown on a second screen 320. The calibration menu 20 is activated by inputting a function key included in the input unit 150, or by touching, when the display unit 130 is formed as a touch screen, an area in which the calibration menu 20 is displayed.

Figure 4:
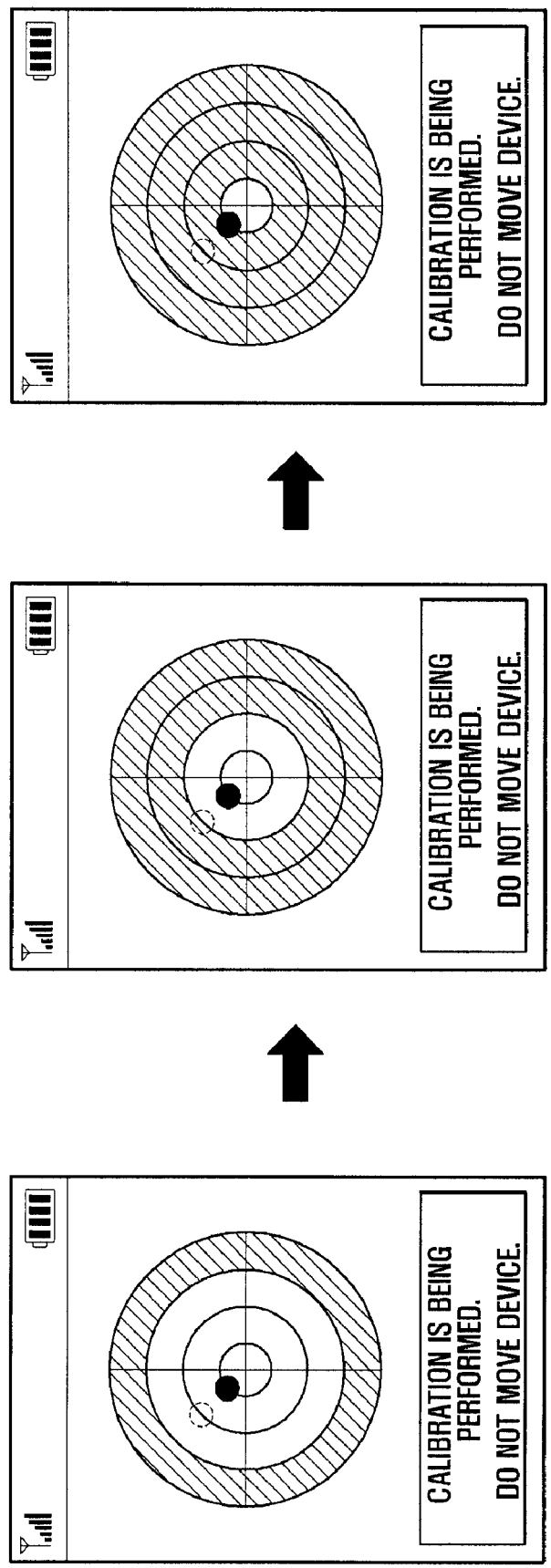
Figure 5:
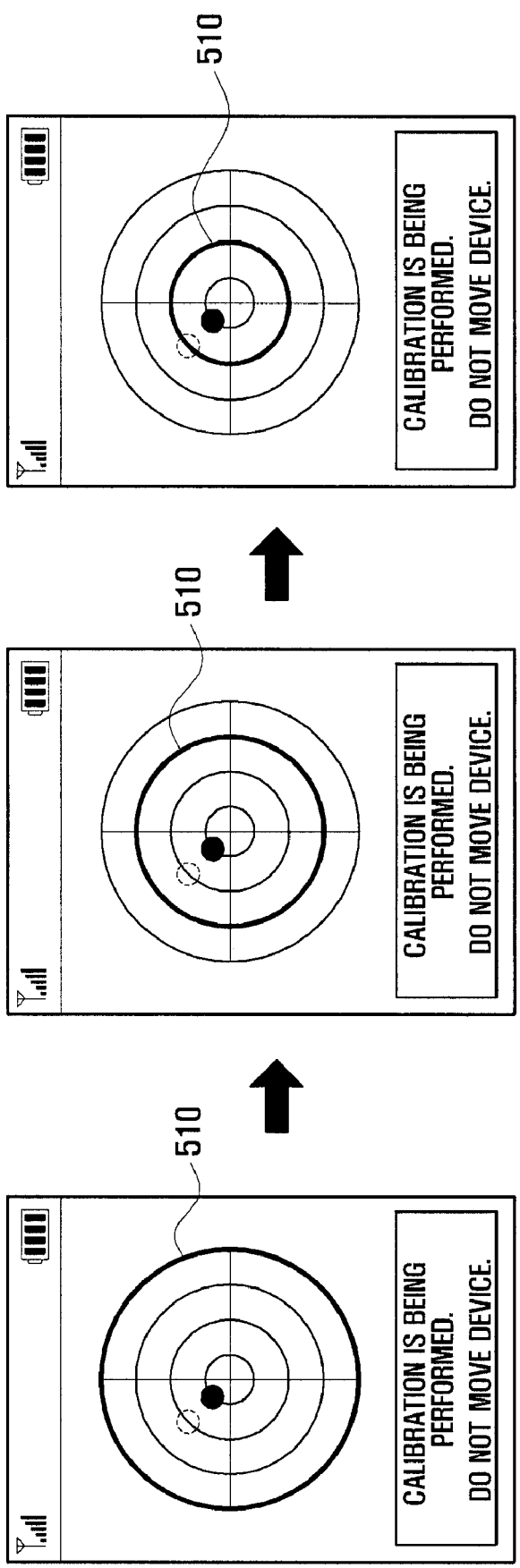
Figure 6:
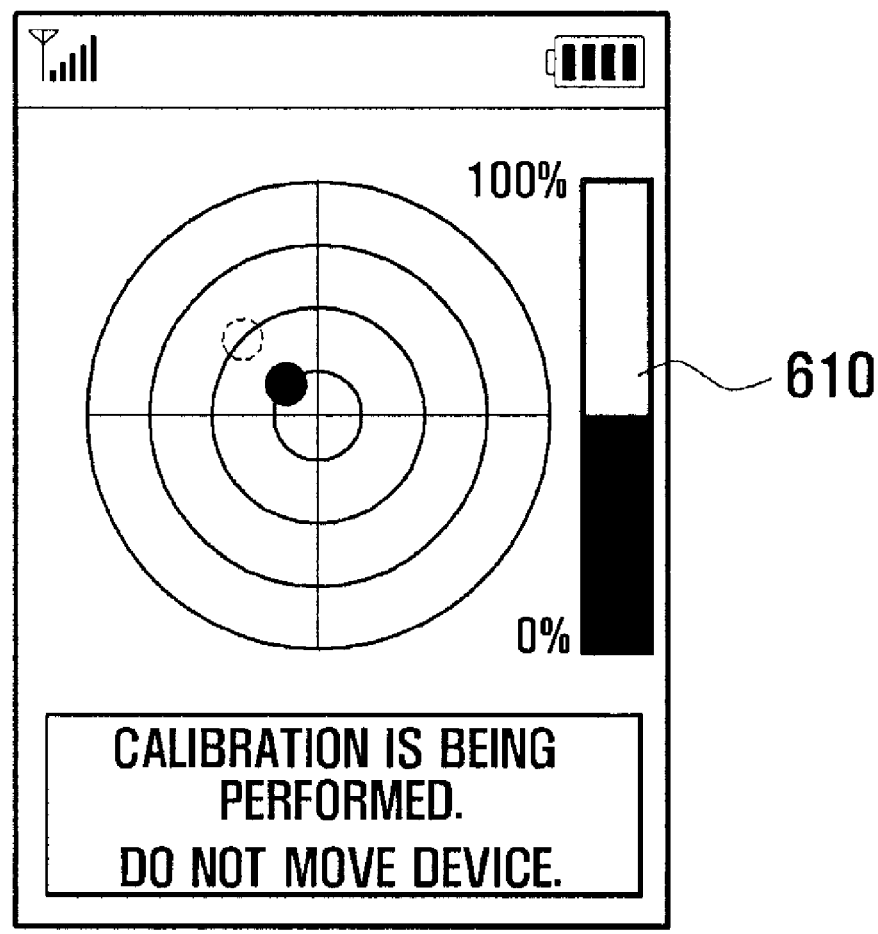

When the calibration menu 20 is activated, the display unit 130 outputs a message notifying of performing a calibration of the motion sensor 140, as shown on a third screen 330. For example, the message may be a pop-up message such as "Calibration is Being Performed. Do not move device". Further, the display unit 130 moves the image 10 in a center direction of the concentric circle 40 according to the progress of the calibration, as shown on the third screen 330 and a fourth screen 340. Alternatively, the display unit 130 can fill the concentric circle 40 with a preset specific color to correspond to a progress degree of a calibration, as shown in FIG. 4. When the concentric circle is completely filled with the specific color, the controller 110 has determined that a calibration of the motion sensor 140 is complete. Alternatively, as shown in FIG. 5, the display unit 130 can output a predetermined size of circle 510 for displaying a progress degree of a calibration and reduce a size of the circle 510 to correspond to a progress degree of the calibration. In this case, the display unit 130 can vary the color of a circle 510 from a color of the concentric circle 40, or display the concentric circle 40 with a solid line and the circle 510 with a dotted line. Alternatively, the display unit 130 can output a progress bar 610 for displaying a calibration progress degree of the motion sensor 140, as shown in FIG. 6.

When a calibration of the motion sensor 140 is complete, the display unit 130 outputs a message notifying that a calibration is complete, as shown on the fourth screen 340. In this case, the image 10 is positioned at the center of a plurality of concentric circles 40. Thereafter, the display unit 130 outputs a fifth screen 350. For example, when the image 10 is positioned at the center of the concentric circle 40, it is determined that a calibration is complete. In this case, the user can recalibrate the motion sensor 140 by activating the calibration menu 20, or terminate a calibration mode by activating a cancellation menu 30.

Figure 3:
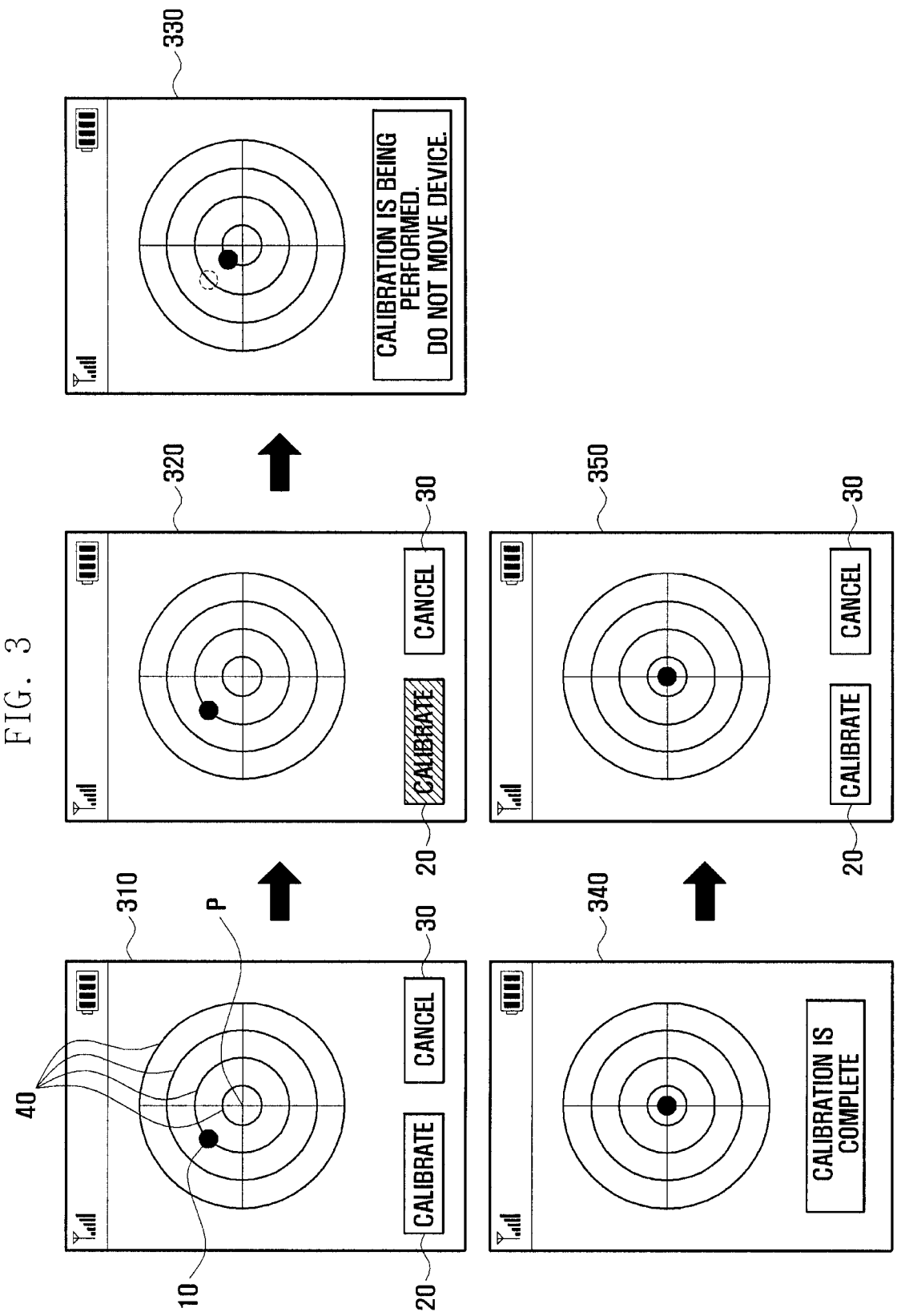
FIGS. 3 to 7 are examples of screens illustrating a process of the method of FIG. 2.

Although not shown in FIG. 3, when the mobile terminal 100 moves while performing a calibration of the motion sensor 140, the display unit 130 outputs a message notifying that a calibration of the motion sensor 140 has stopped, by the control of the controller 110. Further, the display unit 130 outputs a message determining whether to recalibrate the motion sensor 140.

Figure 7:
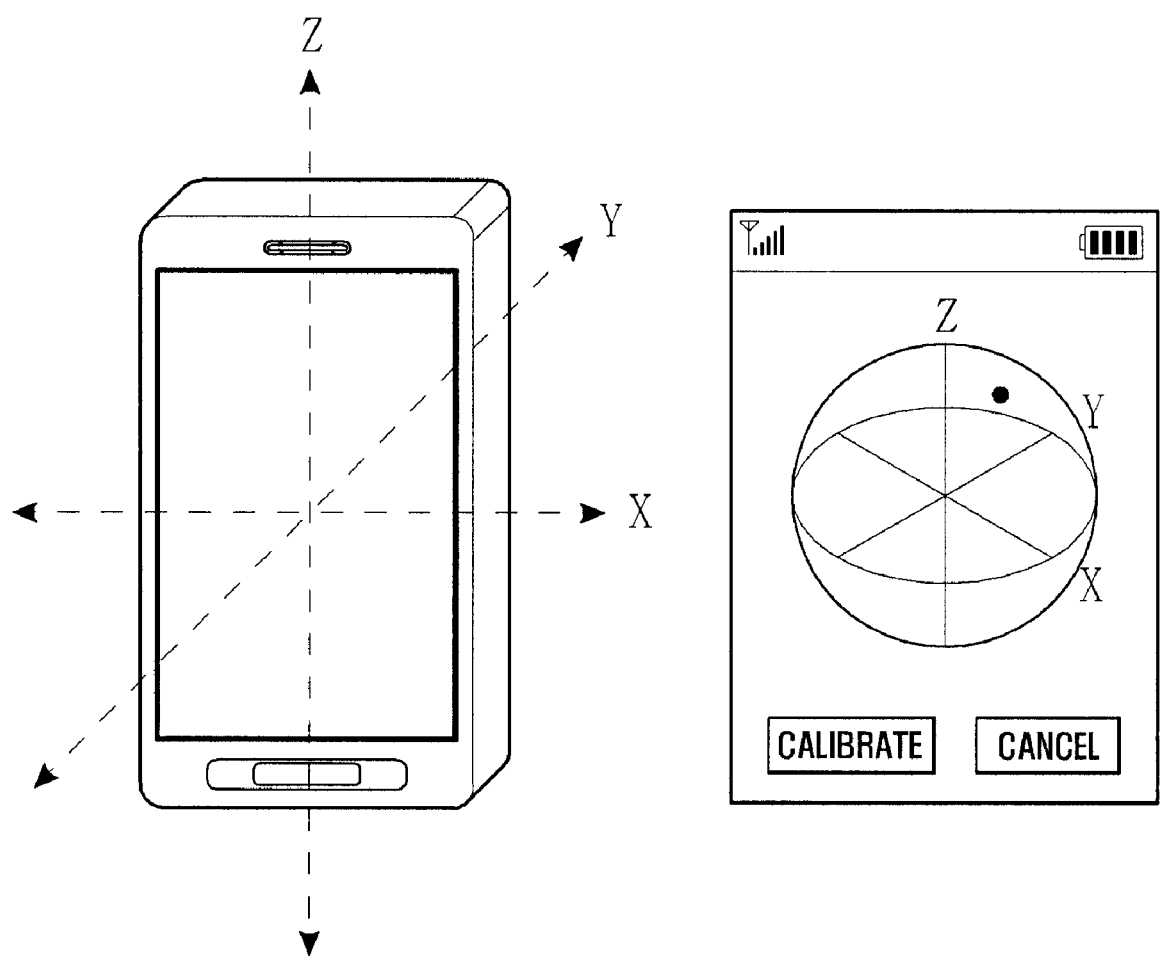

In the foregoing description, the controller 110 controls the display unit 130 to display a horizontal state of the mobile terminal 100 using inclination information of a horizontal direction and a vertical direction, but the present invention is not limited thereto. For example, as shown in FIG. 7, the controller 110 receives inclination information of three directions, for example a horizontal direction (x-axis), vertical direction (y-axis), and height (z-axis) from the motion sensor 140 and controls to output the inclination information of the mobile terminal 100 to the display unit 130 using the inclination information of the three directions as an order pair.

As described above, according to the present invention, because an image is output by combining inclination information of at least two directions of the mobile terminal 100, the user can easily determine a horizontal state of the mobile terminal 100, and while performing a calibration of the motion sensor 140, the user does not move the mobile terminal 100, and if the mobile terminal 100 is moved while performing a calibration of the motion sensor 140, the mobile terminal stops performing the calibration, such that an erroneous calibration of the motion sensor 140 can be prevented. Further, the user can determine a calibration progress degree at a look and measure a horizontal degree of objects (e.g. a desk and a washing machine) using a preview screen of the calibration mode.

Although exemplary embodiments of the present invention have been described in detail hereinabove, it should be clearly understood that many variations and modifications of the basic inventive concepts herein embodied in the appended claims, which may appear to those skilled in the art, will still fall within the spirit and scope of the claimed invention.

A person of ordinary skill in the art should understand and appreciate that the description of "touch" encompasses the use of a stylus and/or substantial touch such that a finger or stylus comes within a predetermined distance of the screen sufficient to be sensed as touch.

What is claimed is:

1. A calibration device of a mobile terminal, comprising:
   a motion sensor for detecting inclination information about at least two directions of a current position of the mobile terminal as an ordered pair; and
   a display unit for outputting, when a calibration mode is activated, inclination information about the detected at least two directions of the current position of the mobile terminal as one image on a coordinate system,
   wherein when said at least two directions of a current position comprises three directions, said one image is displayed on a three-directional coordinate system to show inclination information regarding horizontal direction, vertical direction and height direction as detected by the motion sensor.

2. The calibration device of claim 1, further comprising a controller for controlling output of a warning message notifying that the mobile terminal cannot be moved while performing a calibration of the motion sensor, when a calibration instruction of the motion sensor is input.

3. The calibration device of claim 2, wherein the controller calculates an offset value for amending an error of the motion sensor.

4. The calibration device of claim 3, further comprising a storage unit for storing the calculated offset value, when a calibration of the motion sensor is complete.

5. The calibration device of claim 2, wherein the display unit displays a degree of progress of the calibration of the motion sensor.

6. The calibration device of claim 2, wherein the controller stops the calibration of the motion sensor when a motion of the mobile terminal is detected while performing the calibration of the motion sensor, and outputs a message notifying the calibration has stopped.

7. The calibration device of claim 2, wherein the controller stops a calibration of the motion sensor when a motion of the mobile terminal is detected while performing the calibration of the motion sensor, and outputs at least one of a message notifying the calibration has stopped and a message requested whether to recalibrate the motion sensor.

8. The calibration device of claim 2, wherein the display unit outputs at least one concentric circle using a starting point of the coordinate system as the center.

9. The calibration device of claim 8, wherein the controller controls the display unit to fill the at least one concentric circle with a preset specific color that corresponds to a degree of progress of the calibration.

10. The calibration device of claim 2, wherein the controller controls the display unit to move the image in a starting point direction of the coordinate system and to output the moved image to corresponds to a progress degree of the calibration.

11. A method of calibrating a mobile terminal comprising a motion sensor for detecting an inclination of at least two directions of a current position of the mobile terminal, said method comprising:
    activating a calibration mode for calibrating an error of the motion sensor;
    outputting an indication when a calibration mode is activated;
    displaying a coordinate system for displaying at least facets of two information; and
    outputting inclination information of at least two directions received from the motion sensor as one image on the coordinate system,
    wherein said at least two directions of a current position received from the motion sensor comprises three directions, said one image is displayed on a three-directional coordinate system to show inclination information in a horizontal direction, vertical direction and height direction as detected by the motion sensor.

12. The method according to claim 11, wherein the indication output is one of a visual indication.

13. The method according to claim 11, wherein the indication output is a user interface screen for calibrating the motion sensor that includes said two facets of information of the coordinate system.

14. The method of claim 11, further comprising:
- notifying a user that the mobile terminal cannot be moved while performing a calibration of the motion sensor, when a calibration is performed according to an input of a calibration instruction; and
- displaying a degree of progress of a calibration of the motion sensor.

15. The method of claim 14, wherein displaying a coordinate system for displaying at least two facets of information comprises outputting at least one concentric circle using a starting point of the coordinate system as the center.

16. The method of claim 15, wherein displaying the degree of progress of a calibration of the motion sensor comprises at least one of:
- filling the at least one concentric circle with a preset specific color to correspond to a progress degree; and
- moving the image to a starting point of the coordinate system to correspond to the progress degree.

17. The method of claim 11, further comprising calculating and storing an offset value for amending an error of the motion sensor.

18. The method of claim 11, further comprising stopping a calibration of the motion sensor when the mobile terminal moves before a calibration of the motion sensor is complete.

19. The method of claim 18, further comprising outputting at least one of a message notifying that a calibration of the motion sensor has stopped and a message requesting whether or not to recalibrate the motion sensor.

* * * * *